United States Patent [19]

Fukuda et al.

[11] Patent Number: 4,938,504
[45] Date of Patent: Jul. 3, 1990

[54] MALFUNCTION PREVENTING DEVICE FOR AIR BAG MODULE IN AUTOMOBILES

[75] Inventors: Junichi Fukuda; Hisakazu Okuhara; Koichi Kamiji; Naoki Okuyama, all of Wako, Japan

[73] Assignee: Honda Giken Kogyo Kabushiki Kaisha, Tokyo, Japan

[21] Appl. No.: 165,336

[22] Filed: Mar. 8, 1988

[30] Foreign Application Priority Data

| Mar. 9, 1987 | [JP] | Japan | 62-53507 |
| Mar. 13, 1987 | [JP] | Japan | 62-58338 |
| Mar. 13, 1987 | [JP] | Japan | 62-58339 |
| Apr. 1, 1987 | [JP] | Japan | 62-79893 |

[51] Int. Cl.$^5$ .................... B60R 21/08; B60R 21/22
[52] U.S. Cl. .................................... 280/731; 280/735
[58] Field of Search .................. 280/735, 731, 728; 340/52 H, 52 E; 307/105 B, 66; 200/61.54

[56] References Cited

U.S. PATENT DOCUMENTS

| 3,847,411 | 11/1974 | Herrmann | 280/735 |
| 3,848,695 | 11/1974 | Lacaze Jr. | 280/735 |
| 3,871,472 | 3/1975 | Hosaka et al. | 280/735 |
| 3,916,376 | 10/1975 | Tuttle | 280/735 |
| 4,167,276 | 9/1979 | Bell et al. | 280/731 |
| 4,366,465 | 12/1982 | Veneziano | 340/52 R |

FOREIGN PATENT DOCUMENTS

| 3619937 | 12/1987 | Fed. Rep. of Germany | 290/734 |
| 2172389 | 2/1973 | France | |
| 53-78536 | 7/1978 | Japan | |

Primary Examiner—Charles A. Marmor
Assistant Examiner—Karin Tyson
Attorney, Agent, or Firm—Armstrong, Nikaido, Marmelstein, Kubovcik & Murray

[57] ABSTRACT

In an air bag module mounted on a steering wheel of an automobile for use, an inflater for rapidly supplying a high-pressure gas into an air bag of the module upon detection of a deceleration of a vehicle body higher than a predetermined value is connected in parallel to a primary power supply carried on the vehicle body and to a separate auxiliary power supply through an actuating circuit, and means for neutralizing the auxiliary power supply is provided to prevent the malfunction or accidental operation of the module.

18 Claims, 10 Drawing Sheets

MALFUNCTION PREVENTING DEVICE FOR AIR BAG MODULE IN AUTOMOBILES

BACKGROUND OF THE INVENTION

1. Field of the Invention

The present invention relates to a malfunction preventing device for an air bag module in automobiles, in which upon occurrence of a crash accident of an automobile, an air bag is rapidly inflated to prevent a driver from colliding against a steering wheel, a front glass or the like.

2. Description of the Prior Art

In automobiles having an air bag module detachably mounted on a steering wheel, which module comprises an air bag, an inflater adapted to rapidly supply a high pressure gas into the air bag, and a deceleration sensing mechanism for operating the inflater when a deceleration of a vehicle body has been increased to a level higher than a given value, there is conventionally known an apparatus wherein in order to prevent the malfunction of the module separated from the steering wheel, a locking mechanism adapted for engagement with the deceleration sensing mechanism to neutralize the latter, i.e., to maintain it ineffective is operated in the condition that the air bag module has been detached, as described, for example, in U.S. Pat. No. 4,167,276.

In the above prior art apparatus, the exclusive locking mechanism operable with removal or detachment of the module should be specially added to the deceleration sensing mechanism having a complicated structure from requirement for a high accuracy. This results in the over-all arrangement being complicated and in an increased cost. Additionally, there is also a fear of reduction in operational precision for the deceleration sensing mechanism.

SUMMARY OF THE INVENTION

The present invention has been accomplished with the foregoing in view, and it is an object of the present invention to provide a malfunction preventing device for an air bag module, which is simple in structure and in which the problems associated with the prior art apparatus can be overcome.

To attain the above object, according to the present invention, there is provided a malfunction preventing device for an air bag module including, as power sources, a primary power supply carried on a vehicle body of an automobile and an auxiliary power supply, the both power supplies being connected in parallel to an actuating circuit, wherein the auxiliary power supply includes operating-function neutralizing means for neutralizing a function for operating an inflater.

With the above construction, the inflater cannot be accidentally or unintendedly operated, even if the deceleration sensing mechanism is accidentally operated in removing the air bag module from a steering wheel, because the auxiliary power supply is neutralized by the operating-function neutralizing means upon such removal of the air bag module. Moreover, it is unnecessary to apply a special artifice and adaption to the deceleration sensing switch required for a high accuracy and having a complex structure and therefore, it is possible to provide a malfunction preventing device simple in over-all structure, and the deceleration sensing switch is also out of danger of reduction in its operational precision.

Furthermore, because the auxiliary power supply is provided in addition to the primary power supply, the air bag module can be certainly operated when required, even if a trouble such as breaking of wire is produced in the primary power supply.

With the above construction, if the operating-function neutralizing means includes a discharging circuit, the voltage of the auxiliary power supply can be dropped by the discharging circuit down to a level at which the inflater cannot be operated, thereby ensuring that the malfunction or unintended operation of the air bag module by the auxiliary power supply can be reliably prevented when the air bag module is separated from the primary power supply carried on a vehicle body.

The above and other objects, features and advantages of the invention will become apparent from reading of the following description of the preferred embodiments, taken in conjunction with the accompanying drawings.

BRIEF DESCRIPTION OF THE DRAWINGS

Drawings illustrate several embodiments of the present invention.

DESCRIPTION OF THE PREFERRED EMBODIMENTS

Several embodiments of the present invention will now be described with reference to the accompanying drawings. Like parts are designated by like reference numerals and characters throughout these embodiments.

Figure 1:
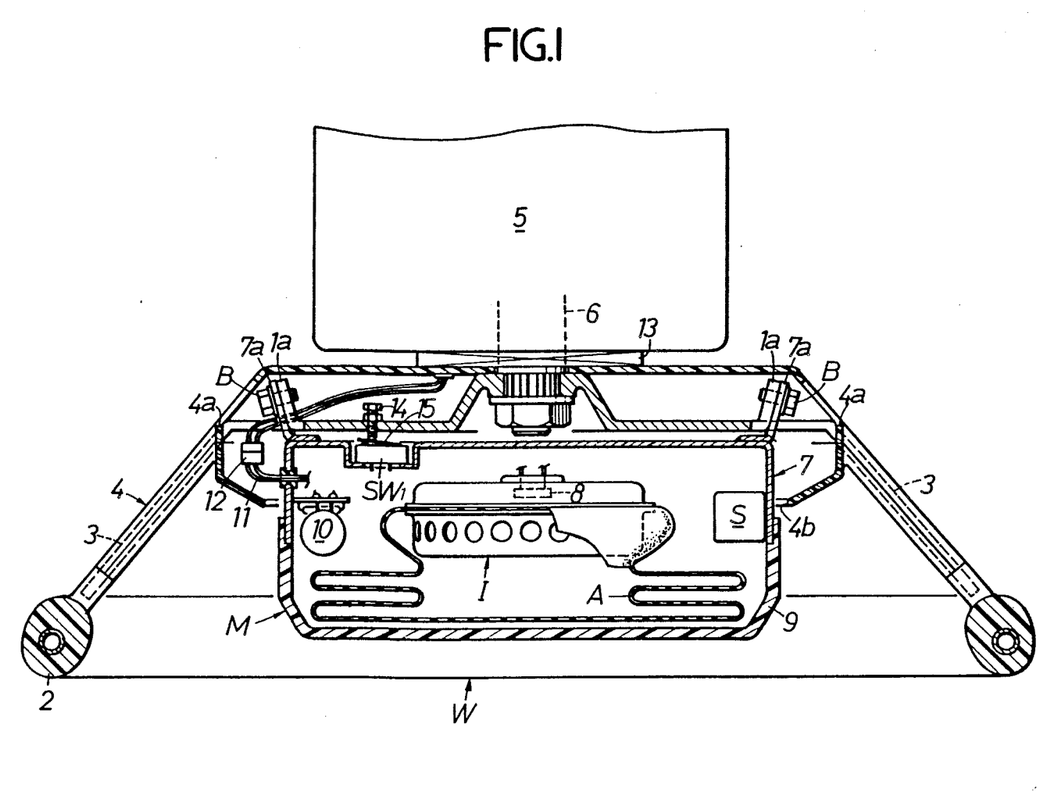
FIGS. 1 and 2 illustrate a first embodiment, FIG. 1 being a general view in longitudinal section of a steering wheel portion having an air bag module mounted thereon, and FIG. 2 being a general circuit diagram.
Figure 2:
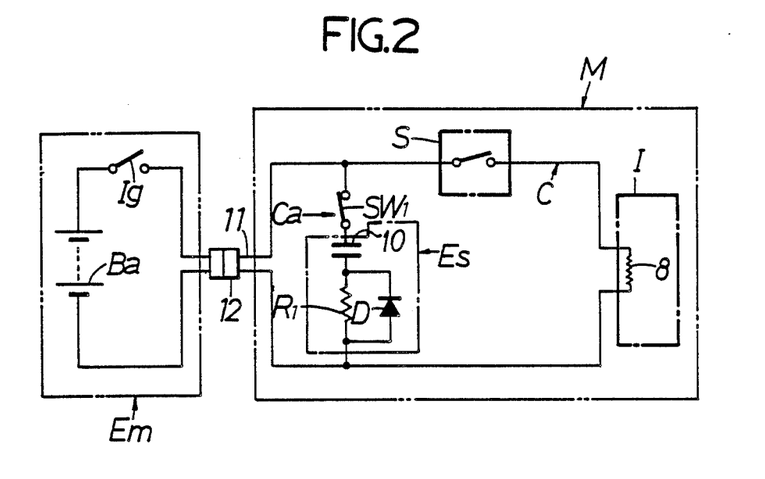

FIGS. 1 and 2 illustrate a first embodiment of the present invention. Referring first to FIG. 1, a steering wheel W for an automobile comprises a central boss plate 1, an annular wheel rim 2 which is a grip, at most two left and right spokes 3 radially extending from left and right opposite sides of the boss plate 1 at distances circumferentially spaced apart from one another to integrally interconnect the wheel rim 2 and the boss plate 1, and a longitudinally split wheel cover 4 secured to the spokes 3 and the boss plate 1 to cover them. The boss plate 1 is connected to a rear end of a steering shaft 6 which is rotatably carried on a steering column 5.

A bowl-like module case 7 for an air bag module M is attached to the boss plate 1 in the following manner. Left and right ends of the boss plate 1 are bent toward the steering column 5. A pair of left and right brackets 7a are fixedly mounted on a bottom surface of the module case 7 to bear against the corresponding bent ends 1a. A bolt B is threadedly inserted into each bent end 1a through the bracket 7a to secure the bracket 7a to the boss plate 1. The wheel cover 4 is provided with a pair of through holes 4a for insertion of a tool (not shown) for tightening the bolt B and also with an opening 4b surrounding an outer periphery of the module case 7 at a small gap left therebetween.

The air bag module M comprises an inflater I for rapidly supplying a high-pressure gas into the air bag A, an actuating circuit C connected to a primary power supply Em mounted on a vehicle body for actuating an ingnitor 8 of the inflater I by a power supplied from the primary power supply Em, a deceleration sensing switch S incorporated in the actuating circuit C and normally opened, but closed when a deceleration more than a given value acts on the vehicle body, and an auxiliary power supply Es connected to the actuating circuit C in parallel to the primary power supply Em. These elements are contained and held inside the module case 7. A bowl-like module cover 9 is attached to an edge of an open edge of the modular case 7, and a leading portion of the air bag A secured at its base portion to an outer periphery of the inflater I is contained in a folded manner in a space enclosed by the module cover 9.

As shown in FIG. 2, a battery Ba carried on the vehicle and an ignition switch for an engine (not shown) is incorporated in parallel in the primary power supply Em, but alternatively, the ignition switch Ig can be omitted from the primary power supply Em. In addition, the auxiliary power supply Es comprises a capacitor 10, a resistor R1 across which a current flows during charging into the capacitor 10, and a diode D which is disposed in parallel to the resistor R1 and across which a current flows during discharging from the capacitor 10.

A connecting cord 11 for connecting the actuating circuit C and the primary power supply Em is provided with a coupler 12 capable of disconnecting a portion of the cord 11 for the air bag module M and a portion of the cord 11 for the steering wheel W from each other, and a known slip ring 13 is incorporated in the portion of the cord 11 for the steering wheel W for permitting relative rotation between the steering wheel W and the steering column 5.

The auxiliary power supply Es is provided with operating-function neutralizing means Ca for neutralizing a function of operating an ignitor 8 of the inflater I in order to prevent a malfunction or accidental operation of the air bag module M in a condition of the module M removed from the steering wheel W. In this embodiment, the neutralizing means Ca comprises an on/off switch Sw1 connected in series to the capacitor 10 and the resistor R1 in the auxiliary power supply Es. The switch Sw1 is adapted to be closed upon mounting of the air bag module M on the steering wheel W and to be opened upon removal of the air bag module M from the steering wheel W. The switch Sw1 which may be used is, for example, a normally-open microswitch mounted on a bottom portion of the module case 7 so that a switching element 15 bears against an adjusting screw 14 mounted in the boss plate 1 when the module M has been attached.

Description will be made of the operation of the above embodiment. The air bag module M, which has been attached to the steering wheel W, has the brackets 7a on the bottom surface of the module case 7 secured to the brackets 1a of the boss plate 1 through the bolts B. In this state, the on/off switch Sw1 is maintained closed by engagement of the switching element 15 with the adjusting screw 14 in the boss plate 1 and hence, the auxiliary power supply Es is in a state to effectively function. In a normal operation of the automobile, the deceleration sensing switch S cannot be operated and is maintained open, because a deceleration acting on the vehicle body is less than a given value. It follows that the actuating circuit C is in the state in which it has been opened only by the deceleration sensing switch S.

Accordingly, when a deceleration larger than the given value acts on the vehicle body due to a crash accident caused by the automobile in such condition, the deceleration sensing switch S is operated immediately to close the actuating circuit C, thereby energizing the ignitor 8 of the inflater I from the primary supply Em, so that the ignitor 8 fires a detonator (not shown) in the inflater I. This causes a high pressure gas to be rapidly supplied into the air bag A from the inflater I, so that the air bag A rapidly inflates to break through the module cover 9 and largely stand in front of a driver. This enables the driver to be prevented from colliding against the steering wheel W, a front glass (not shown) or the like. In addition, in such crash accident, even if the energization of the actuating circuit from the primary power supply is failed due to breaking of a wire or the like, a power is supplied from the auxiliary power supply Es to the actuating circuit C, without an obstacle to the operation of the inflater I.

To remove the unoperated air bag module M from the steering wheel W, the individual bolts B may be loosened and withdrawn outside through the hole 4a in the wheel cover 4. Then, the modular case 7 may be manually pulled rearwardly along an axis of the steering wheel W, and the coupler 12 for the connecting cord 11 may be disconnected. The detachment of the module M causes the on/off switch Sw1 to be opened automatically to neutralize the auxiliary power supply Es, so that no power may be supplied from the auxiliary power supply to the actuating circuit C. As a result, even if the deceleration sensing switch S should be operated into a closed state due to a shock or the like, the inflater I cannot be accidentally or unintendedly operated.

Figure 3:
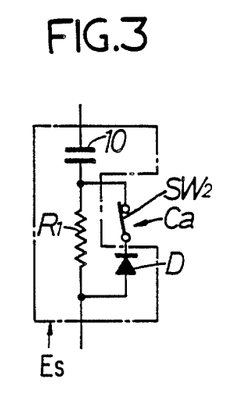
FIGS. 3 and 4 are partial circuit diagrams illustrating modifications of the first embodiment, respectively.
Figure 4:
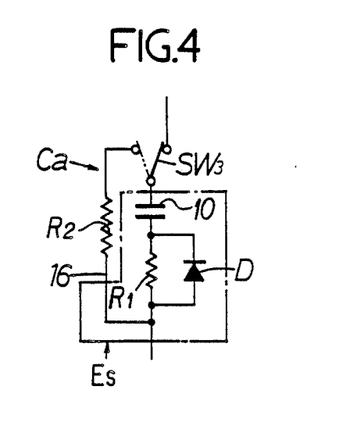

Two modifications of the operating function neutralizing means Ca of the first embodiment are shown in FIGS. 3 and 4. The modification shown in FIG. 3 is of a construction such that an on/off switch Sw2 similar to the on/off switch Sw1 of the previous embodiment is connected in the auxiliary power supply Es in series to the capacitor 10 and in parallel to the resistor R1. In this modification, upon removal of the air bag module M from the steering wheel W, the on/off switch Sw2 which has been theretofore in a closed state is automatically changed-over into an opened state. After such changing-over, the capacitor 10 will discharge a current through the resistor R1 as the deceleration sensing switch S is accidentally or unintendedly operated into a closed state. However, the current discharged from the capacitor is insufficient to operate the ignitor 8 of the inflater I, because such current is relatively small due to the presence of the resistor R1.

Additionally, the operating-function neutralizing means Ca shown in FIG. 4 comprises a discharging circuit 16 connected to the auxiliary power supply Es around the capacitor 10. The discharging circuit 16 includes a discharging resistor R2 disposed in the discharging circuit 16 and an on/off switch Sw3. The switch SwC is adapted to assume a first position (indicated by a two-dotted chain line in FIG. 4) in which the discharging circuit 16 is electrically connected with the capacitor 10 and the auxiliary power supply Es is opened, and a second position (indicated by a solid line in FIG. 4) in which such electrical connection is cut off and the auxiliary power supply Es is closed. For example, the on/off switch Sw3 which may be used is a microswitch as described in the embodiment shown in FIG. 1. The microswitch may be provided in the module M, so that it may be automatically changed-over into a second position upon attachment of the air bag module M to the steering wheel W and into a first position upon detachment of the module M. In this embodiment, in concurrence to removal of the air bag module M from the steering wheel W, the on/off switch Sw3 which has been theretofore in the second position is changed-over automatically into the first position, so that a relative large current is discharged from the capacitor 10 to the discharging circuit 16, but because the auxiliary power supply Es is now opened by the on/off switch Sw3, such discharged current cannot operate the ignitor 8 of the inflater I.

In the above embodiments and modifications, the individual switches Sw1, Sw2 and Sw3 have been designed to be operated in response to attachment or detachment of the air bag module M to and from the steering wheel W, but it will understood that the switches Sw1, Sw2 and Sw3 may be replaced by a manual switch which can be opened and closed or changed-over as desired and which may be attached to the air module M for operation from the outside.

Figure 5:
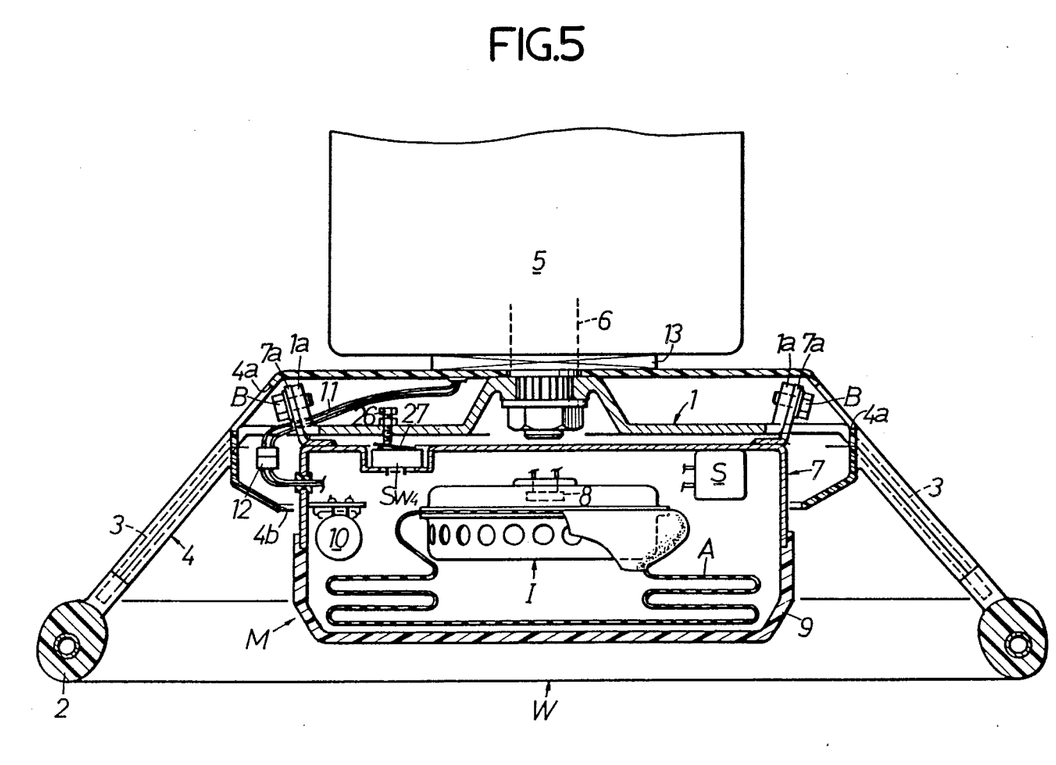
FIGS. 5 and 6 illustrate a second embodiment, FIG. 5 being a general view similar to FIG. 1, and FIG. 6 being a general circuit diagram thereof.
Figure 6:
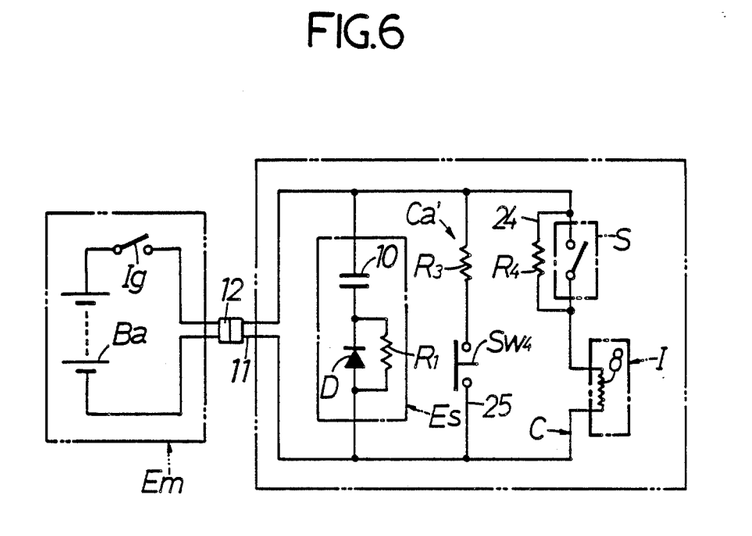

FIGS. 5 and 6 illustrate a second embodiment of the present invention. This embodiment is substantially similar to the first embodiment, except a difference between constructions of operating-function neutralizing means.

As shown in FIG. 6, the operating function neutralizing means Ca' in the present embodiment comprises a short circuit 25 connected to the actuating circuit C around the decelerating sensing switch S and around the ignitor 8 of the inflater I, and an on/off switch Sw4 incorporated in the short circuit and adapted to become opened upon attachment of the module M to the steering wheel W and to become closed upon detachment of the module M. An example of the switch Sw4 which may be used is a normally closed microswitch attached to a bottom wall of the module case 7, so that a switching element 27 bears against an adjusting screw 26 mounted in the boss plate 1 upon the above-described attachment of the module M. A resistor R3 is also disposed in the short circuit 25 for protection of the circuit.

In addition, an energizing circuit 24 having a resistor R4 is connected to the actuating circuit C around the deceleration sensing switch S in order to permit a very weak current for monitoring a trouble to constantly flow across the actuating circuit C even when the deceleration sensing switch S is open. Alternatively, the energizing circuit 24 may be omitted.

In the second embodiment, in a normal operation of the automobile, the trouble-monitoring very weak current flows across the actuating circuit C due to the presence of the energizing circuit 24, but is insufficient to actuate the ignitor 8 of the inflater I. However, when the automobile gives rise to a crash accident, so that a deceleration more than a given value acts on the vehicle body, the deceleration sensing switch S is closed to permit supplying of a power to the actuating circuit C from the primary power supply Em, or from the auxiliary power supply Es when the primary power supply Em is in a disconnected state, so that the inflater I is rapidly actuated as in the the first embodiment.

Meanwhile, when the unoperated air bag module M is removed from the steering wheel W, the on/off switch Sw4 is closed in response to such removal, so that the short circuit 25 conducts to permit a relative large current to be discharged to the short circuit from the capacitor 10 in the auxiliary power supply Es. The causes the electric potential at the auxiliary power supply Es to rapidly drop down to a level lower than a level at which the actuating circuit is able to function. Thus, the ignitor 8 of the inflater I cannot be thereafter actuated even if the deceleration sensing switch S should be accidentally or unintendedly operated due to a shock or the like.

Figure 7:
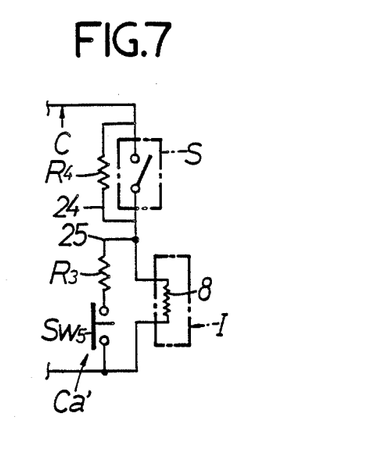
FIG. 7 is a partial circuit diagram illustrating a modification of a short circuit of the second embodiment.

A modification of the short circuit 25 of the second embodiment is shown in FIG. 7. A short circuit 25 in the modification is connected to the actuating circuit C around only the ignitor 8 serving as a power-supplied portion of the inflater I. A protecting resistor R3 in the short circuit 25 has a resistance value substantially smaller than that of the ignitor 8. An on/off switch Sw5 similar to that in the second embodiment is also incorporated in the short circuit 25 and adapted to be automatically closed to permit the short circuit 25 to conduct upon removal of the module from the steering wheel W. Upon such conduction, a current discharged from the capacitor 10 flows across the energizing circuit 24 having the resistor R4 and hence, an excessive large current cannot flow across the short circuit 25 even if the circuit-protecting resistor R3 is small.

Figure 8:
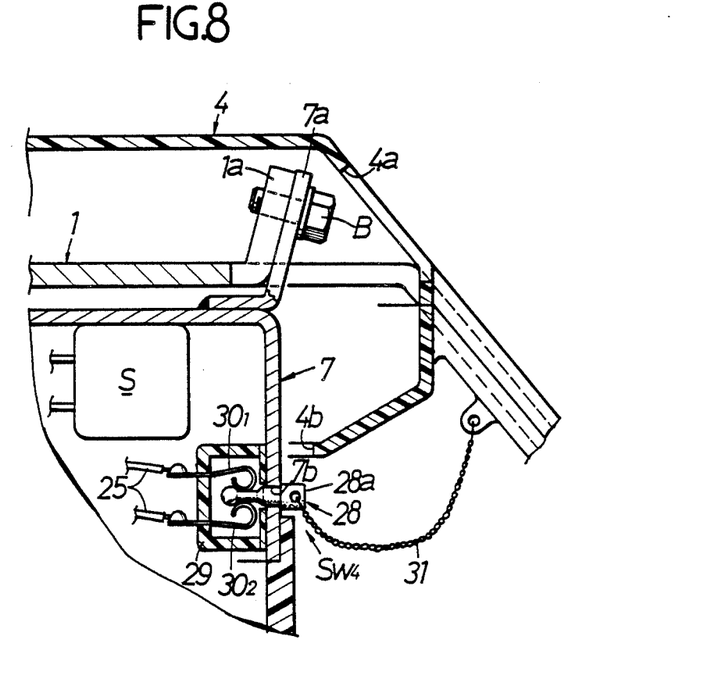
FIG. 8 is an enlarged sectional view of a modification of an on/off switch of the second embodiment.

Further, a modification of the on/off switch Sw4 of the second embodiment is shown in FIG. 8. An on/off switch Sw6 in this modification comprises an electrically insulating insert pin 28 withdrawably inserted into the through hole 7b in the sidewall of the module case 7, an electrically insulating box 29 fixedly mounted on an inner surface of the sidewall of the module case 7, and first and second terminals $30_1$ and $30_2$ having free ends extending into the box 29 and cooperating with each other to resiliently clamp a leading end portion of the pin 28. The both terminals $30_1$ and $30_2$ are designed to open the short circuit 25 in the their pin 28-clamping states in which they are spaced apart from each other, and to close the short circuit 25 in their states in which they bear against each other under the action of their own resilient forces with the pin 28 removed from therebetween. A knob 28a of the insert pin 28 is connected to the wheel cover 4 through a flexible connecting member 31 such as a chain and hence, it is difficult to completely separate the module M from the steering wheel W unless the insert pin 28 is withdrawn from the module M to close the short circuit 25. Alternatively, the connecting member 31 may be, of course, omitted to enable detachment of the module M from the steering wheel W independently of withdrawal of the insert pin 28.

FIGS. 9 to 12 illustrate a third embodiment of the present invention. In this embodiment, operating-function neutralizing means of an auxiliary power supply of the present invention is different from those of the above embodiments in respect that it has locking means capable of inhibiting the separation of the air bag module from the steering wheel.

Figure 9:
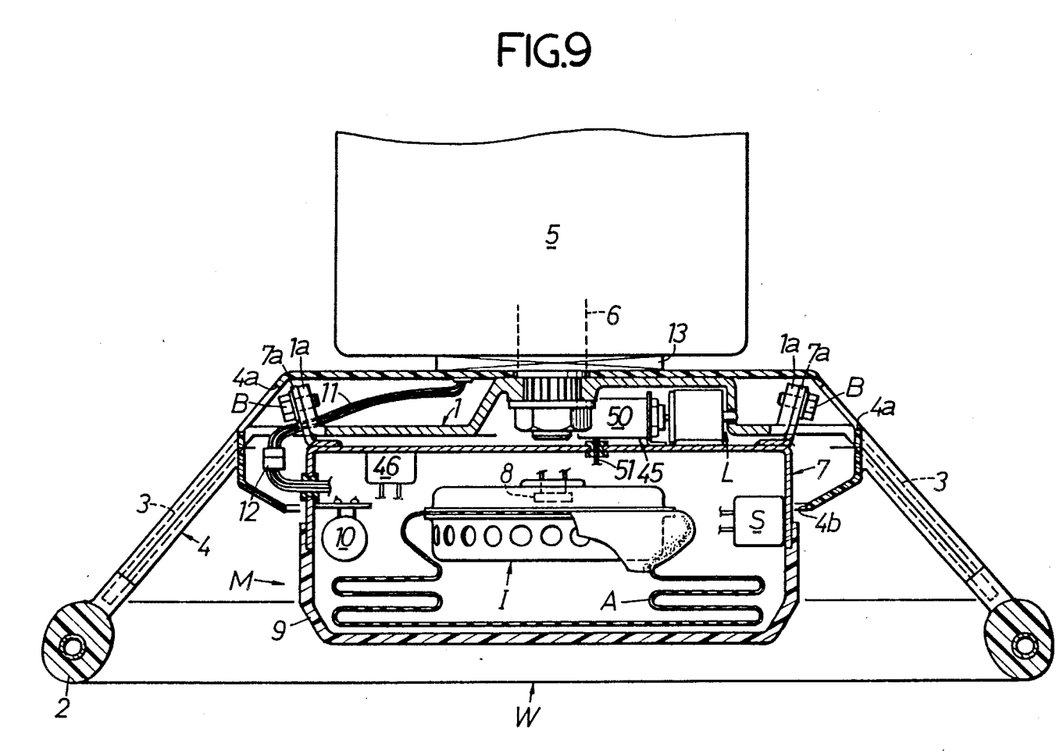
FIGS. 9 to 12 illustrate a third embodiment, FIG. 9 being a general view similar to FIG. 1, FIG. 10 being a general circuit diagram thereof, FIG. 11 being an enlarged sectional view of locking means which is in operation, and FIG. 12 being an enlarged sectional view of the locking means which is inoperative.
Figure 10:
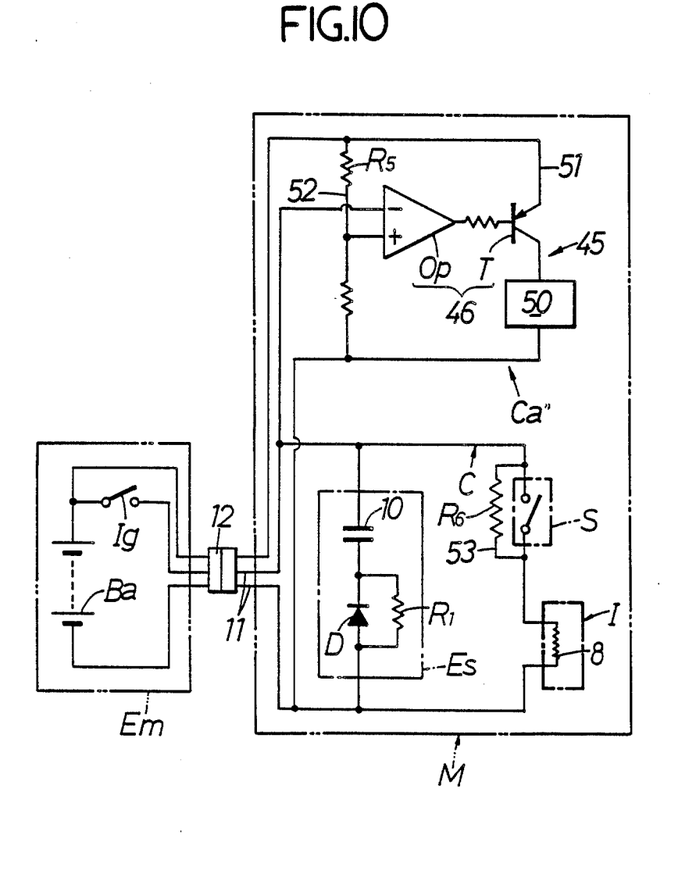

More specifically, the operating-function neutralizing means Ca" in the present embodiment comprises the locking means L capable of inhibiting the separation of the air bag module M from the steering wheel W, drive means 45 for operating the locking means L, and operation control means 46 for activating the drive means when the voltage of the auxiliary power supply Es is at a predetermined level, i.e., higher than a level at which the actuating circuit C can be allowed to effectively function, and for deactivating the drive means 45 when that voltage is reduced lower than the predetermined level.

Figure 11:
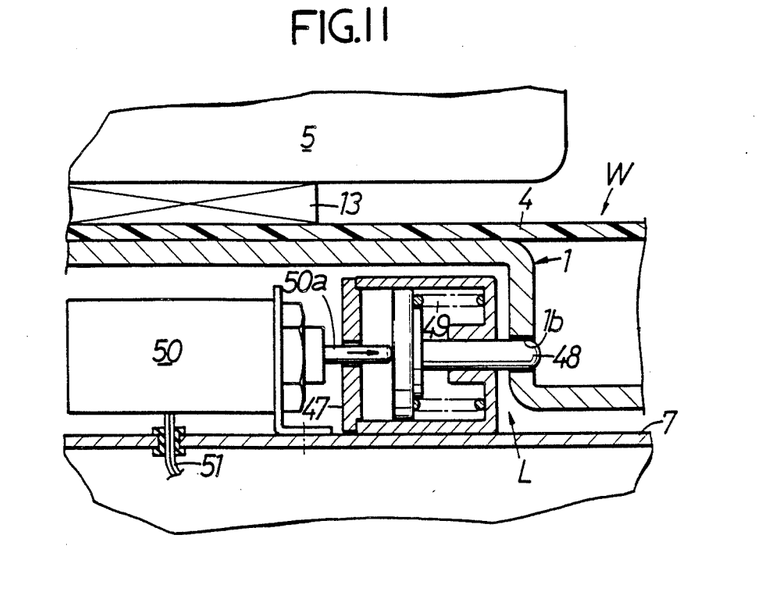
Figure 12:
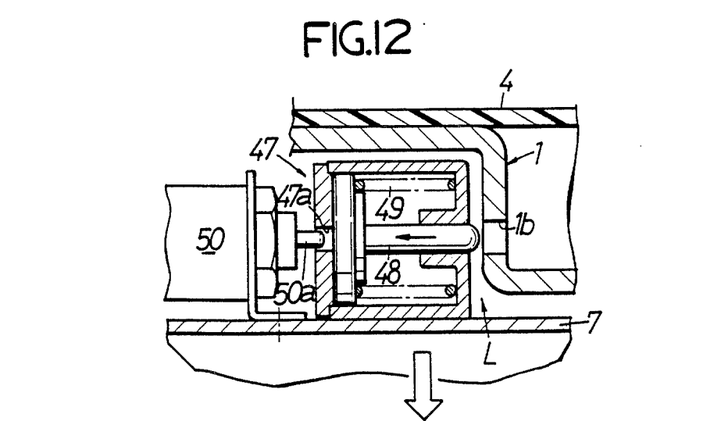

As shown in FIGS. 11 and 12, the locking means L is comprised of a casing 47 fixedly mounted on the bottom wall of the module case 7, a lock pin 48 adapted to be slidably passed through one sidewall of the casing 47 to engage an engage hole 1b in the boss plate 1, and a spring 49 for biasing the pin 48 away from the engage hole 1b. Fitting of the pin 48 into the engage hole 1b inhibits separation of the module M from the steering wheel W.

The drive means 45 includes an electromagnetic actuator 50 supported on the bottom wall of the module case 7 and having an actuating element 50a passed through a hole 47a in the other sidewall of the casing 47 and opposed to a base portion of the lock pin 48, and a power line 51 for permitting a power to be supplied from the vehicle-carried battery Ba to the actuator 50, so that upon excitation of the actuator 50, the actuating element 50a thereof is advanced to retain the lock pin 48 in a lock position against a force of the spring 49 (see FIG. 11), and upon deexcitation of the actuator 50, the actuating element is retreated to release the lock pin 48 (see FIG. 12).

The operation-control means 46 includes a transistor T adapted to permit opening and closing of the power line, and an operational amplifier Op having an output terminal connected to a base of the transistor T. An (+) input terminal of the operational amplifier Op is connected to the battery Ba but not through the ignition switch Ig, and a resistor R5 and the above described coupler 12 are incorporated on the way of such connection circuit 52. In addition, an (−) input terminal of the operational amplifier Op is also connected to the power supplies Em and Es.

It is noted that the reference numeral 53 in FIG. 10 designates an energizing circuit having a resistor R6 and similar to that of the second embodiment, which circuit is connected to the actuating circuit C around the deceleration sensing switch S in order to permit a trouble monitoring very weak current to constantly flow across the actuating circuit C even when the deceleration sensing switch S is open.

In this embodiment, in a normal operation of the automobile, the ignitor 8 of the inflater I is operated in the just same manner as in the first and second embodiments, if a deceleration higher than a given value acts on the vehicle body.

Now, whenever an engine is being operated, i.e., whenever the ignition switch Ig is in the closed state, the voltage at the (−) input terminal of the operational amplifier Op is higher than that at the (+) input terminal due to the presence of the resistor R5 and hence, the transistor T is closed by an output signal from the amplifier Op to excite the electromagnetic actuator 50, thereby maintaining the lock means L in an operative state shown in FIG. 11. When the engine is not stopped from this state, the voltage of the auxiliary power supply Es is applied to the (−) input terminal of the amplifier Op. Because this voltage is initially higher than a voltage at the (+) input terminal, the actuator 50 is thereby operated in the same manner as described above, so that the locking means L is maintained in the operative state shown in FIG. 11. Thus, the module M cannot be separated from the boss plate 1 under this condition, even if the individual bolts B have been removed.

However, when energization of the operational amplifier Op from the auxiliary power supply Es results in the voltage of the power supply Es being reduced to the predetermined level, i.e., lower than the lever at which the actuating circuit is able to function, the voltage at the (−) input terminal is smaller than that at the (+) input terminal, so that an output signal from the amplifier Op is removed to open the transistor T. This causes the actuator 50 to be deexcited, whereby the locking means L is changed-over to an inoperative state shown in FIG. 12. Thus, it is possible to remove the module M. Specifically, the module M can be completely separated from the steering wheel W under this condition by loosening the individual bolts B to withdraw them through the holes 4a in the wheel cover 4 and thereafter, merely by manually pulling the module case 7 rearwardly along the axis of the steering wheel W while disconnecting the coupler 12 for the connecting cord 11. After such separation, the inflater I cannot be operated even if the deceleration sensing switch S is accidentally or unintendedly operated due to a shock or the like, because the voltage of the auxiliary power supply Es has been already reduced lower than the lever at which the actuating circuit C is able to function.

Figure 13:
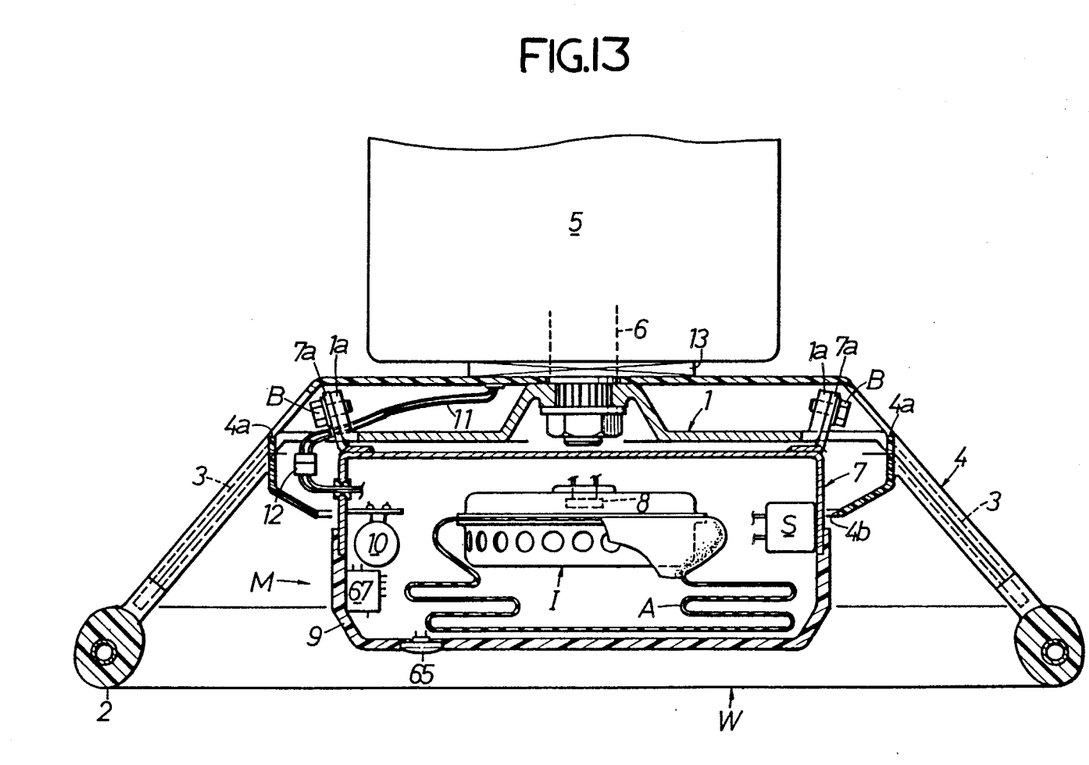
FIGS. 13 and 14 illustrate a fourth embodiment, FIG. 13 being a general view similar to FIG. 1, and FIG. 14 being a general circuit diagram thereof.
Figure 14:
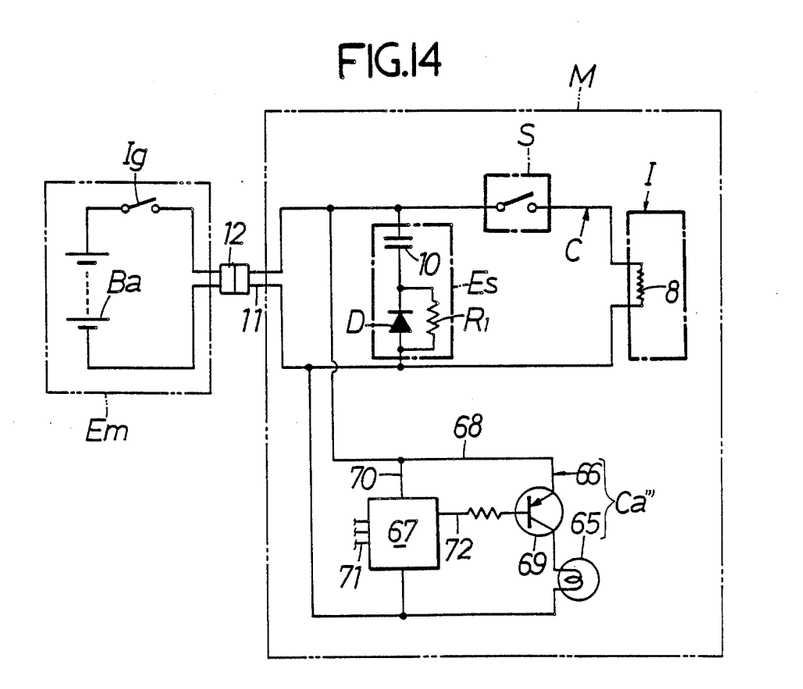

FIGS. 13 and 14 illustrate a fourth embodiment of the present invention. Operating-function neutralizing means of the present embodiment includes alarm means for notifying a disconnection of a circuit extending from the power supply to the ignitor of the inflater.

More specifically, operating-function neutralizing means Ca''' of the present embodiment comprises an alarm lamp 65 serving as the alarm means and mounted on the module cover 9 so as to be visible by a driver, and an alarm circuit 66 adapted to permit energization of the alarm lamp 65 from the auxiliary power supply Es to turn on the lamp 65. The alarm circuit 66 comprises a monitor circuit 67 which is arranged to enable detection of breaking between the primary power supply Em and the actuating circuit C and of breaking within the actuating circuit C (e.g., a trouble of breaking in the ignitor 8) and which delivers a higher level signal when there is no such detected breaking, and delivers a lower level signal (in this embodiment, zero V) upon detection of such breaking, a connection circuit 68 which connects the auxiliary power supply Es with the alarm lamp 65, and a transistor 69 adapted to open the connection circuit 68 upon reception of the aforesaid higher level signal and to close the connection circuit upon reception of the aforesaid lower level signal. The monitor circuit 67 and the auxiliary power supply Es are interconnected through a power line 70 for supplying an activating power to the circuit 67.

It is noted that the reference numeral 71 in FIG. 14 designates a line for an input signal into the monitor circuit 67 and connected to a circuit portion which is to be detected for the aforesaid breaking therein, and the reference numeral 72 denotes a line for an output signal from the monitor circuit 67 and connected to a base of the transistor 69.

In this embodiment, if the coupler 12 of the connecting cord 11 connecting the primary power supply Em on the vehicle body side with the actuating circuit C of the module M is disconnected in removing the unoperated air bag module M from the steering wheel W, the monitor circuit 67 detects the resulting cut-off state and produces the lower level signal in place of the higher level signal theretofore delivered, so that the connection circuit 68 conducts through the transistor 69, permitting a power to be supplied from the capacitor 10 of the auxiliary power supply Es to the alarm lamp 65 to flash the lamp 65. Such discharging from the capacitor 10 causes the function of the monitor circuit 67 receiving the power from the capacitor 10 through the power line 70 to be stopped immediately thereafter, so that the output signal from the monitor circuit 67 is removed. However, if the output signal from the circuit 67 has been set at zero V as in this embodiment, the connection circuit 68 is maintained closed through the transistor 69 and hence, the alarm lamp 65 is subsequently turned on. This turning-on makes it possible to visually confirm that the module M is still functioning. Upon completion of discharging from the capacitor 10, the alarm lamp 65 is turned off and hence, it can be confirmed that the function of the module M has been completely stopped. In this state, the inflater I cannot accidentally operated at all, even if the deceleration sensing switch S is accidentally or unintendedly operated.

When a breaking trouble in the actuating circuit C, e.g., a breaking trouble of the ignitor 8 occurs during operation of the automobile, a situation of such trouble is detected in the monitor circuit 67, so that the output signal delivered from the monitor circuit 67 is changed-over from the higher level to the lower level. This enables the alarm lamp 65 to be turned on in the same manner as described above to alarm the driver.

When the ignition switch Ig is incorporated in the primary power supply Em, the output signal from the monitor circuit 67 is changed-over from the high level to the lower level in concurrence to stoppage of the engine for parking or the like, so that the alarm lamp 65 is turned on in the same manner as described above, and thereafter, the function of the module M can be completely stopped as a result of completion of discharging from the capacitor 10.

In most of the above-described embodiments, the operating function neutralizing means according to the present invention has been constructed as discharging means, so that after removal of the air bag module from the steering wheel, the current is discharged from the auxiliary power supply incorporated in the module to prevent the malfunction or accidental operation of the inflater from the auxiliary power supply, but it should be understood that such discharging means may be any one which is capable of immediately dropping the electric potential at the auxiliary power supply to a level lower than a level at which the inflater is able to function.

What is claimed is:

1. A malfunction preventing air bag module in a motor vehicle said motor vehicle having a primary power supply means carried on a body of said motor vehicle for supplying power, wherein said air bag module is detachably mounted in the motor vehicle, said malfunction preventing air bag module comprising:
   an air bag;
   an inflator means for supplying a bag-inflating high pressure gas into said air bag;
   an actuating circuit means for actuating said inflator means;
   said primary power supply means supplying power to said inflator means;
   an auxiliary power supply means connected in parallel to said primary power supply means for supplying auxiliary power to said inflator means;
   a deceleration sensing circuit means for opening said actuating circuit means and for closing said actuating circuit means when a deceleration of said body of said vehicle exceeds a predetermined value; and
   an operating-function neutralizing means, operatively connected to said auxiliary power supply means, for neutralizing operation of said inflator means, said neutralizing means comprising a discharge means for causing said auxiliary power supply means to discharge current when the air bag module is separated from its mounting position in the vehicle.

2. A malfunction preventing air bag module according to claim 1, wherein said operating-function neutralizing means is automatically operated upon removal of said air bag module from said vehicle body.

3. A malfunction preventing air bag module according to claim 1, wherein said discharging means comprises a resistor.

4. A malfunction preventing air bag module according to claim 3, wherein said operating-function neutralizing means further includes a switch which is opened upon removal of said air bag module from said vehicle body, so that said auxiliary power supply discharges a current through said resistor upon opening of said switch.

5. A malfunction preventing air bag module according to claim 1, wherein said discharging means comprises a resistor connected to said actuating circuit in parallel to said auxiliary power supply.

6. A malfunction preventing air bag module according to claim 1, wherein said operating-function neutralizing means comprises a short circuit connected to said actuating circuit bypassing said inflater, and an on/off switch incorporated in said short circuit.

7. A malfunction preventing air bag module according to claim 6, wherein said short circuit extends further to bypass said deceleration sensing circuit.

8. A malfunction preventing air bag module according to claim 6, wherein said short circuit further includes a resistor provided therein, and said on/off switch is closed upon removal of said air bag module from said steering wheel, so that closing of said on/off switch permits said auxiliary power supply to discharge a current to said short circuit.

9. A malfunction preventing air bag module according to claim 6, wherein said on/off switch is of a manually operated type.

10. A malfunction preventing device according to claim 1, wherein said operating-function neutralizing means includes locking means to prevent separation of said air bag module from the wheel.

11. A malfunction preventing air bag module according to claim 10, wherein said primary power supply is used as a power source for driving said locking means, and said auxiliary power supply is used as said power source after disconnection of said primary power supply from said actuating circuit.

12. A malfunction preventing device according to claim 11, wherein said locking means is released from its locking state when the voltage of said auxiliary power supply is reduced to a level at which said inflater cannot be operated.

13. A malfunction preventing air bag module according to claim 1, wherein said operating-function neutralizing means includes alarm means for notifying a breaking in a circuit extending from said primary power supply to said inflater.

14. A malfunction preventing air bag module according to claim 13, wherein said primary power supply is used as a power source for driving said alarm means, and said auxiliary power supply is used as said power source after disconnection of said primary power supply from said actuating circuit.

15. A malfunction preventing air bag module according to claim 14, wherein said alarm means stops generating an alarm when the voltage of said auxiliary power supply is reduced to a level at which said inflater cannot be operated.

16. The air bag module of claim 1, wherein said air bag module is detachably mounted on a steering wheel of the vehicle.

17. A malfunction preventing air bag module in a motor vehicle, said motor vehicle having a primary power supply means carried on a body of said motor vehicle for supplying power, wherein said air bag module is detachably mounted in the motor vehicle, said malfunction preventing air bag module comprising:
an air bag;
an inflator means for supplying a bag-inflating high pressure gas into said air bag;
an actuating circuit means for actuating said inflator means;
said primary power supply means supplying power to said inflator means;
an auxiliary power supply means connected in parallel to said primary power supply means for supplying auxiliary power to said inflator means;
a deceleration sensing circuit means for opening said actuating circuit means and for closing said actuating circuit means when a deceleration of said body of said vehicle exceeds a predetermined value; and
operating-function neutralizing means, operatively connected to said auxiliary power supply means, for neutralizing operation of said inflator means, wherein said neutralizing means comprises a discharging means which includes a switch means for selectively changing-over connections of said auxiliary power supply means with a resistor and said actuating circuit means so that said switch means neutralizes said auxiliary power supply upon removal of said air bag module from the vehicle, thereby permitting said auxiliary power supply to discharge a circuit through said resistor.

18. The air bag module of claim 17, wherein said air bag module is detachably mounted on a steering wheel of the vehicle.

* * * * *